United States Patent [19]

Katz

[11] Patent Number: 4,811,958
[45] Date of Patent: Mar. 14, 1989

[54] SEALED SHAFTS MOVEABLE IN VACUUM CHAMBERS BY EXERCISING CONTROL FROM OUTSIDE

[75] Inventor: George Katz, Ossining, N.Y.

[73] Assignee: North American Philips Corporation, New York, N.Y.

[21] Appl. No.: 207,907

[22] Filed: Jun. 16, 1988

Related U.S. Application Data

[63] Continuation of Ser. No. 46,599, May 7, 1987, abandoned.

[51] Int. Cl.⁴ ............................................. F16J 15/40
[52] U.S. Cl. .................................... 277/12; 277/3; 277/DIG. 7; 73/864.83; 414/292
[58] Field of Search ............ 277/3, 12, 27, 32, 237 R, 277/DIG. 7; 250/289; 414/292; 73/864.83

[56] References Cited

U.S. PATENT DOCUMENTS

| | | | |
|---|---|---|---|
| 2,553,938 | 5/1951 | Peirce | 277/DIG. 7 X |
| 3,410,672 | 11/1968 | De Lajarte | 277/DIG. 7 X |
| 3,643,511 | 2/1972 | Warncke et al. | 73/864.83 X |
| 3,888,300 | 6/1975 | Guichard et al. | 277/DIG. 7 X |
| 3,910,428 | 10/1975 | Peterson | 414/292 |
| 3,984,719 | 10/1976 | Grasis et al. | 313/217 |
| 4,067,697 | 1/1978 | Polaschegg | 422/68 |
| 4,140,228 | 2/1979 | Hathaway et al. | 414/292 X |
| 4,174,842 | 11/1979 | Partus | 277/3 |

FOREIGN PATENT DOCUMENTS 170175 1/1952 Austria .
172795 10/1952 Austria .

Primary Examiner—Robert S. Ward
Attorney, Agent, or Firm—F. Brice Faller

[57] ABSTRACT

A sealed shaft for use in an evacuated chamber in which the shaft can be moved by control from outside the chamber while maintaining the seal around the shaft.

14 Claims, 2 Drawing Sheets

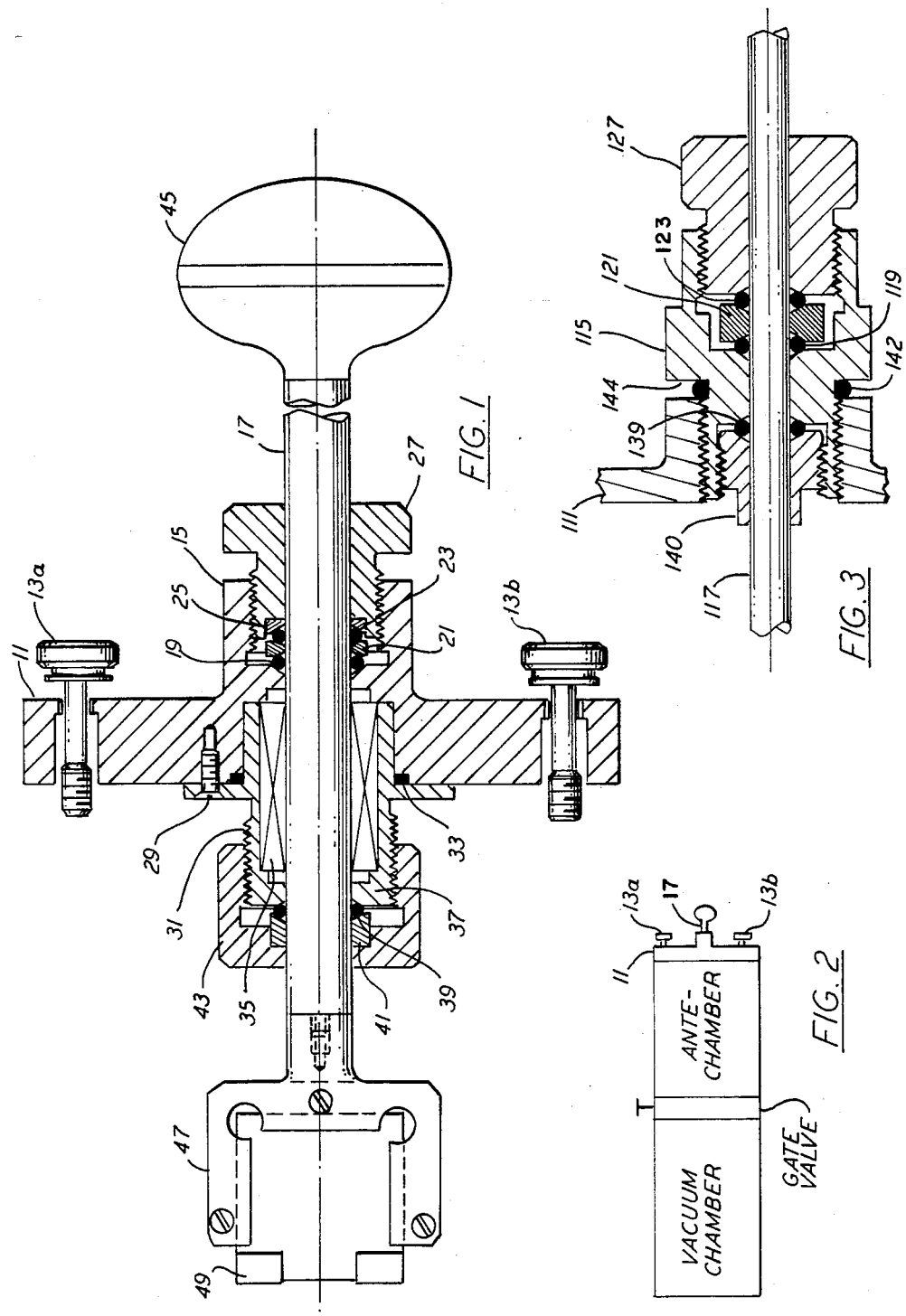

SEALED SHAFTS MOVEABLE IN VACUUM CHAMBERS BY EXERCISING CONTROL FROM OUTSIDE

This is a continuation of application Ser. No. 046,599, filed May 7, 1987 and now abandoned.

This invention relates to apparatus which provides seals around shafts which permit penetration into evacuated chambers with minimal contamination.

In the first disclosed embodiment it relates to sealing an evacuated chamber from its surrounding environment while permitting a shaft to be moved linearly and rotatably inside the chamber in response to control exercised from outside the chamber.

The second disclosed embodiment has been designed to provide a sealed shaft which is intended for only linear motion.

In manufacturing, experimenting and testing it is frequently necessary to direct the motion of objects in evacuated chambers from outside the chamber. Various types of control arrangements have been proposed for this purpose.

It is also frequently necessary to move objects into and out of evacuated chambers. Arrangements for this purpose generally comprise both a vacuum compartment and an antechamber which can be opened to the surrounding environment. The antechamber is sealed from the vacuum compartment by a seal which may take the form of a gate valve. After introduction of a specimen into the antechamber it is sealed against the surrounding environment and evacuated. After evacuation of the antechamber the gate valve can be opened and the specimen introduced into the vacuum compartment.

While vacuum lock arrangements of the forementioned type are commercially available no commercially available equipment is known which provides the rotational freedom provided by the herein disclosed first embodiment.

It is an object of this invention to provide apparatus for sealing an evacuated chamber against its surrounding environment while permitting a shaft in the chamber to be moved from outside the chamber. Both disclosed embodiments provide for linear motion of a shaft. The first disclosed embodiment enables such a shaft to be freely rotated.

One of the features of the invention is that it provides portable apparatus which can be used with any number of evacuated chambers adapted for its use.

An advantage of the invention is that it provides relatively simple, low cost devices.

In carrying out the first embodiment of the invention there is provided apparatus for maintaining an evacuated chamber sealed against its surrounding environment. The apparatus includes a member with an aperture through it. The member includes a tube-like element having a first passage extending from the aperture on a first side of the member. A shaft passes through the first passage. Sealing means between the tube-like element and the shaft seals the first passage against surrounding environment. A bearing sleeve is fitted into the aperture in the member. A bearing is held in the bearing sleeve and the shaft passes through the bearing. The bearing sleeve has a second passage therethrough. The shaft passes through the second passage. The shaft is movable both linearly and rotatably through the sealing means. The shaft has the same cross-sectional area throughout that length of it which moves linearly through the sealing means.

In carrying out both the first and the second embodiment of the invention there is provided apparatus for maintaining an evacuated chamber sealed against its surrounding environment. The apparatus includes a member with an aperture through it. The apparatus includes a tube-like element with a first passage extending from the aperture on a first side thereof. A shaft passes through the first passage. Sealing means between the tube-like element and the shaft seals the first passage against surrounding environment. A second passage is provided for the shaft remote from the first passage. The shaft passes through the second passage. A second sealing means cooperates with the shaft and seals the second passage against surrounding environment. The shaft is movable linearly through both the first and second sealing means. The shaft has the same cross-sectional area throughout that length of it which moves linearly through the sealing means.

Other objects, features and advantages of the invention will become apparent to those skilled in the art from the following description and appended claims when taken in conjunction with the accompanying drawing in which:

FIG. 1 is a sectional side view of the first embodiment of the invention,

FIG. 2 is a diagrammatic representation of the first embodiment of the invention as it would appear in use; and FIG. 3 is a sectional side view of the second embodiment of the invention.

Referring to FIG. 1, member 11 is a plate like article designed to be sealingly attached to one end wall of a unit serving as an antechamber (FIG. 2). A plurality of bolts such as 13a, 13b are provided for this purpose. On a first side of member 11 is tube-like element 15 (FIG. 1). In the constructed first embodiment, element 15 is integral with member 11 although it need not be. Element 15 provides a first passage for shaft 17. In the constructed embodiment shaft 17 is stainless steel in the 300 series. Element 15 is internally threaded and has a bevelled edge 16 at its end closest to the first side of member 11. O-ring 19 is located between this bevelled edge and one bevelled side of washer 21. A second O-ring 23 is trapped between the other bevelled side of washer 21 and bevelled washer 25. Nut 27 is screwed into element 15 to force washers 21 and 25 to press on O-rings 19 and 23 and squeeze their inner surfaces around shaft 17.

Held by bolts such as 29 to the second side of member 11 is bearing sleeve 31. O-ring 33 forms a seal between bearing sleeve 31 and member 11. Linear rotating bearing 35 is held in bearing sleeve 31 and provides linear support for shaft 17. Shaft 17 passes through bearing 35. Extension 37 of bearing sleeve 31 provides a second passage for shaft 17. The left-hand end (as represented in FIG. 1) of extension 37 is bevelled where rod 17 comes out of it. O-ring 34 is trapped between this bevelled edge and the bevelled edge of ring 41. Extension 37 is externally threaded and internally threaded collar 43 is screwed onto this extension. Collar 43 squeezes O-ring 39 between the bevelled edge of extension 37 and the bevelled edge of ring 41.

At one end of shaft 17 is handle 45. At the other end is specimen holder 47 with specimen 49 mounted therein. As can be seen from the drawing specimen holder 47 is screwed onto the end of shaft 17.

In operation plate 11 is attached in a sealed manner to the wall of an antechamber (FIG. 2) which leads through a gate valve into a high vacuum chamber which can be evacuated to an atmosphere of $10^{-9}$ Torr. By closing the gate valve the high vacuum is preserved while a specimen such as 49 held in holder 47 can be inserted into the antechamber which is sealed by member 11. By evacuating the antechamber down close to the high vacuum chamber such as to an atmosphere in the order of $10^{-7}$ Torr the gate valve can be opened and the specimen can be pushed into the high vacuum chamber by moving shaft 17 linearly. Shaft 17 is screwed out of specimen holder 47 which is gripped in the high vacuum chamber by mechanical means (not shown). Shaft 17 can then be withdrawn from the high vacuum chamber so that the gate valve can again be closed and the high vacuum restored.

Tube-like element 15, O-rings 19 and 23, washers or rings 21 and 25 and nut 27 comprise a first sealing means. Extension 37, O-ring 39, ring 41 and collar 43 comprise a second sealing means. As those skilled in the art will understand in order to maintain the sealing character of the first and second sealing means shaft 17 has the same cross-sectional area throughout its length which moves through the sealing means.

With tube-like element 15 integral with member 11 the second sealing means including O-ring 39 and ring 41 is not necessary to provide a sealed shaft. However, in practice this sealing means is found useful in that it enables the antechamber to be evacuated more quickly than it can be when the second sealing means is not provided.

FIG. 3 shows a sealed shaft without a bearing. It includes flanged member 111 with internal threads. Screwed into this member is tube-like element 115 which provides a first passage 116 for shaft 117 on a first side of member 111. This first passage 116 is threaded and has a bevelled edge 118 at its end closest to the first side of member 111. O-ring 119 is located on shaft 117 between this bevelled edge 118 and one bevelled side of washer or ring 121 which also encircles shaft 117. A second O-ring 123 is trapped between the other bevelled side of ring 121 and the bevelled end 128 of nut 127. Nut 127 is screwed into element 115 to squeeze O-rings 119 and 123 around shaft 117.

On the side of element 115 opposite its first passage is a second threaded passage 130 with a bevelled edge 131 at its interior end. O-ring 139 is trapped between this bevelled edge 131 and the bevelled side 141 of nut 140 which is screwed into the second passage. Shaft 117 also passes through the second passage 130 and has O-ring 139 and nut 140 encircling it.

Since element 115 is not integral with member 111, O-ring 142 is squeezed between shoulder 144 of element 115 and the outside bevelled edge 112 of member 111. This seals the threaded cooperating elements of member 111 and element 115. Shaft 117 like shaft 17 also has the same cross-sectional area throughout its length that moves through its seals.

All O-rings in the disclosed embodiments are 60 Dura, Buna-N.

It is understood that various modifications to the above described apparatus will become evident to those skilled in the art and that the apparatus described is for illustrative purposes and is not to be considered restrictive.

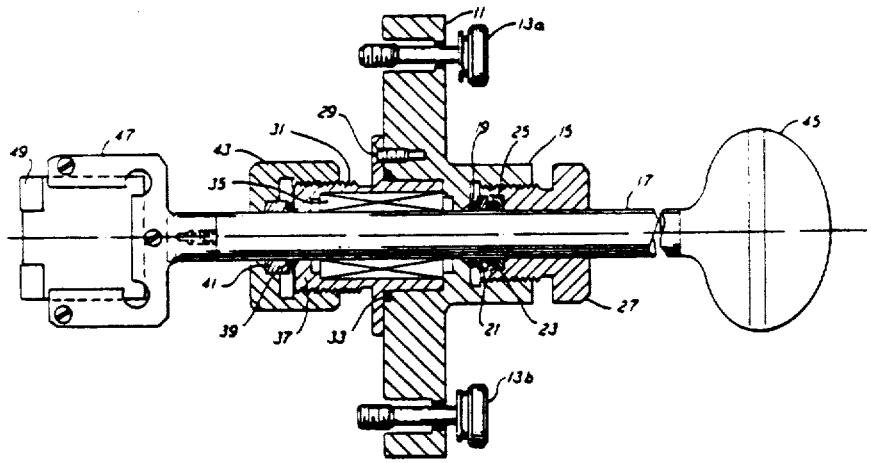

What is claimed is:

1. Apparatus for maintaining an evacuated chamber sealed against surrounding environment, said apparatus including a member with an aperture through it, a tube-like element connected to said member with a first passage extending from said aperture on a first side thereof, a shaft passing through said first passage, a first sealing means between said tube-like element and said shaft sealing said first passage against surrounding environment, a second passage remote from said first passage, said shaft passing through said second passage, and second sealing means cooperating with said shaft and sealing said second passage against surrounding environment, said shaft being movable linearly through said first and second sealing means and having the same cross-sectional area throughout its length which moves linearly through said sealing means.

2. Apparatus as claimed in claim 1, wherein said first sealing means includes a first O-ring encircling said shaft and first pressing means pressing on said first O-ring to squeeze its inner surface around said shaft.

3. Apparatus as claimed in claim 2, wherein said tube-like element has internal threads and a bevelled edge at an end of said first passage cooperating with said first O-ring, said first pressing means including a nut with external threads for being screwed into said tube-like element and a bevelled ring, said nut and said ring having said shaft passed therethrough, said nut when screwed into said tube-like element squeezing said first O-ring between the bevelled ring and the bevelled edge of said tube-like element.

4. Apparatus as claimed in claim 3, wherein said second sealing means includes a second O-ring encircling said shaft and second pressing means pressing on said second O-ring to squeeze its inner surface around said shaft.

5. Apparatus as claimed in claim 4, wherein said second sealing means includes an extension with external threads and a bevelled edge cooperating with said second O-ring, said second pressing means including a collar with internal threads for being screwed onto said extension and a bevelled ring, said ring and said collar having said shaft passed therethrough, said collar when screwed onto said extension squeezing said second O-ring between the bevelled ring and the bevelled edge of said extension.

6. Apparatus as claimed in claim 4, wherein said second passage has internal threads and a bevelled edge cooperating with said second O-ring, said second pressing means including a nut with a bevelled end, said shaft passing through said nut, said nut when screwed into said second passage squeezing said second O-ring between the bevelled edge of said second passage and the bevelled end of said nut.

7. Apparatus for maintaining an evacuated chamber sealed against surrounding environment, said apparatus including a member with an aperture through it, said member including an integral tube-like element extending from said aperture with a first passage extending from a first side of said member, a shaft passing through said first passage, first sealing means between said tube-like element and said shaft sealing said first passage against surrounding environment, a bearing sleeve fitted into said aperture, a bearing held in said bearing sleeve, said shaft passing through said bearing, said bearing sleeve having an extension with a second passage therethrough, said extension extending outwardly from a second side of said member, said shaft passing through said second passage and second sealing means between said extension and said shaft and sealing said second passage against surrounding environment, said shaft being movable both linearly and rotatably through said first and second sealing means and having the same cross-sectional area through its length which moves linearly through said sealing means.

8. Apparatus as claimed in claim 7, wherein said first sealing means includes a first O-ring encircling said shaft and first pressing means pressing on said first O-ring to squeeze its inner surface around said shaft.

9. Apparatus as claimed in claim 8, wherein said tube-like element has internal threads and a bevelled edge at its end closest to said first side of said member cooperating with said first O-ring, and said first pressing means includes a nut with external threads for being screwed into said tube-like element and a bevelled ring, said nut and said ring having said shaft passed therethrough, said nut when screwed into said tube-like element squeezing said first O-ring between the bevelled ring and the bevelled edge of said tube-like element.

10. Apparatus as claimed in claim 9, wherein said second sealing means includes a second O-ring encircling said shaft where it comes out of said second passage in said extension on said second side of said member and second pressing means pressing on said second O-ring to squeeze its inner surface around said shaft.

11. Apparatus as claimed in claim 10, wherein said extension has external threads and a bevelled edge cooperating with said second O-ring and said second pressing means includes a collar with internal threads for being screwed onto said extension and a bevelled ring, said ring and said collar having said shaft passed therethrough, said collar when screwed onto said extension squeezing said second O-ring between the bevelled ring and the bevelled edge of said extension.

12. Apparatus for maintaining an evacuated chamber sealed against surrounding environment, said apparatus including a member with an aperture through it, said member including a tube-like element with a first passage extending from a first side of said aperture, a shaft passing through said first passage, sealing means between said tube-like element and said shaft sealing said first passage against surrounding environment, a bearing sleeve fitted into said aperture in said member, a bearing held in said bearing sleeve, said shaft passing through said bearing, said bearing sleeve having a second passage therethrough, said shaft passing through said second passage, said shaft being movable both linearly and rotatably through said sealing means and having the same cross-sectional area throughout its length which moves linearly through said sealing means.

13. Apparatus as claimed in claim 12, wherein said sealing means includes an O-ring encircling said shaft and pressing means pressing said O-ring to squeeze its inner surface around said shaft.

14. Apparatus as claimed in claim 13, wherein said tube-like element has internal threads and a bevelled edge at an end of said first passage cooperating with said O-ring, and said pressing means includes a nut with external threads for being screwed into said tube-like element and a bevelled ring, said nut and said ring having said shaft passed therethrough, said nut when screwed into said tube-like element squeezing said O-ring between the bevelled ring and the bevelled edge of said tube-like element.

* * * * *

UNITED STATES PATENT AND TRADEMARK OFFICE
CERTIFICATE OF CORRECTION

PATENT NO. : 4,811,958

DATED : March 14, 1989

INVENTOR(S) : GEORGE KATZ ET AL

It is certified that error appears in the above-identified patent and that said Letters Patent is hereby corrected as shown below:

On the title page, under item [19], "Katz" should be --Katz et al.--; and in item [75]:

Add as a joint inventor

--Theadore NALESNIK,
Yonkers, New York --

Signed and Sealed this

Twenty-second Day of January, 1991

Attest:

HARRY F. MANBECK, JR.

*Attesting Officer*   *Commissioner of Patents and Trademarks*

UNITED STATES PATENT AND TRADEMARK OFFICE
CERTIFICATE OF CORRECTION

PATENT NO. : 4,811,958

DATED : March 14, 1989

INVENTOR(S) : George Katz, et al.

It is certified that error appears in the above-identified patent and that said Letters Patent is hereby corrected as shown below:

On the title page, item [75] add inventor:

--Theadore Nalesnik,
          Yonkers, New York-- ( as shown on attached sheet)

In item [19] add --et al.--

Signed and Sealed this

Ninth Day of April, 1991

Attest:

HARRY F. MANBECK, JR.

*Attesting Officer*      *Commissioner of Patents and Trademarks*

United States Patent [19]

Katz et al.

[11] Patent Number: 4,811,958
[45] Date of Patent: Mar. 14, 1989

[54] SEALED SHAFTS MOVEABLE IN VACUUM CHAMBERS BY EXERCISING CONTROL FROM OUTSIDE

[75] Inventor: George Katz, Ossining, N.Y. and Theodore Nalesnik, Yonkers, N.Y.

[73] Assignee: North American Philips Corporation, New York, N.Y.

[21] Appl. No.: 207,907

[22] Filed: Jun. 16, 1988

Related U.S. Application Data

[63] Continuation of Ser. No. 46,599, May 7, 1987, abandoned.

[51] Int. Cl.⁴ .............................................. F16J 15/40
[52] U.S. Cl. ........................................ 277/12; 277/3; 277/DIG. 7; 73/864.83; 414/292
[58] Field of Search ............. 277/3, 12, 27, 32, 237 R, 277/DIG. 7; 250/289; 414/292; 73/864.83

[56] References Cited

U.S. PATENT DOCUMENTS

| | | | |
|---|---|---|---|
| 2,553,938 | 5/1951 | Peirce | 277/DIG. 7 X |
| 3,410,672 | 11/1968 | De Lajarte | 277/DIG. 7 X |
| 3,643,511 | 2/1972 | Warncke et al. | 73/864.83 X |
| 3,888,300 | 6/1975 | Guichard et al. | 277/DIG. 7 X |
| 3,910,428 | 10/1975 | Peterson | 414/292 |
| 3,984,719 | 10/1976 | Grasis et al. | 313/217 |
| 4,067,697 | 1/1978 | Polaschegg | 422/68 |
| 4,140,228 | 2/1979 | Hathaway et al. | 414/292 X |
| 4,174,842 | 11/1979 | Partus | 277/3 |

FOREIGN PATENT DOCUMENTS 170175 1/1952 Austria.
172795 10/1952 Austria.

Primary Examiner—Robert S. Ward
Attorney, Agent, or Firm—F. Brice Faller

[57] ABSTRACT

A sealed shaft for use in an evacuated chamber in which the shaft can be moved by control from outside the chamber while maintaining the seal around the shaft.

14 Claims, 2 Drawing Sheets